(12) United States Patent
Yang et al.

(10) Patent No.: US 7,061,225 B2
(45) Date of Patent: Jun. 13, 2006

(54) APPARATUS AND METHOD THEREOF FOR MEASURING OUTPUT CURRENT FROM PRIMARY SIDE OF POWER CONVERTER

(75) Inventors: Ta-yung Yang, Milpitas, CA (US); Guo-Kiang Hung, Sindian (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 10 days.

(21) Appl. No.: 10/881,202

(22) Filed: Jun. 29, 2004

(65) Prior Publication Data

US 2005/0285587 A1    Dec. 29, 2005

(51) Int. Cl.
*G01R 19/30* (2006.01)
*H02M 3/335* (2006.01)

(52) U.S. Cl. ............... 324/103 P; 324/103 R; 363/21.16; 363/21.18

(58) Field of Classification Search ............ None
See application file for complete search history.

(56) References Cited

U.S. PATENT DOCUMENTS 5,901,051 A * 5/1999 Takahashi et al. ....... 363/21.18
6,744,649 B1 * 6/2004 Yang et al. .................. 363/98
6,862,194 B1 * 3/2005 Yang et al. .................. 363/16

* cited by examiner

*Primary Examiner*—Minh N. Tang
(74) *Attorney, Agent, or Firm*—J.C. Patents

(57) ABSTRACT

An apparatus and method thereof for measuring an output current from a primary side of a power converter are provided. A peak detector is designed to sample a peak value of a converted voltage of a primary-side switching current. A zero-current detector detects a discharge-time of a secondary-side switching current through an auxiliary winding of a transformer. An oscillator generates a switching signal for switching the power converter. An integrator generates an integrated signal by integrating the converted voltage of the primary-side switching peak current with the discharge-time. The time constant of the integrator is correlated with the switching period of the switching signal. The integrated signal is thus proportional to the output current of the power converter.

20 Claims, 5 Drawing Sheets

APPARATUS AND METHOD THEREOF FOR MEASURING OUTPUT CURRENT FROM PRIMARY SIDE OF POWER CONVERTER

BACKGROUND OF THE INVENTION

1. Field of the Invention

The present invention relates to a power converter, and more specifically, to a monitoring and control method thereof.

2. Description of the Related Art

Various power converters have been widely used to provide regulated voltage and current. For the sake of safety, an off-line power converter must provide galvanic isolation between its primary side and secondary side. In case that a control circuit is configured at the primary-side of the power converter, it would be difficult to measure an output current. Therefore it is desirable to provide an apparatus and method thereof for measuring the output current of the power converter at the primary side thereof. The measured output current thus can serve for further output current control and/or the power converter protection, etc.

SUMMARY OF THE INVENTION

In one aspect of the present invention, a method for measuring an output current from a primary side of a power converter is provided. The apparatus includes a peak detector to sample a converted voltage of a primary-side switching peak current, a zero-current detector for detecting a discharging time of a secondary-side switching current via an auxiliary winding of the transformer, an oscillator generating a switching signal for switching the power converter, and an integrator for generating an integrated signal by integrating the converted voltage of the primary-side switching peak current with the discharging time. In order to obtain an output current of the power converter, the integrated signal is proportional to the output current since a time constant of the integrator is correlated with the switching period of the switching signal.

In another aspect of the present invention, the method for measuring output current from the primary side of power converter is provided. The method includes sampling converted voltage of a primary-side switching peak current by a peak detector, detecting the discharging time of the secondary-side switching current via an auxiliary winding of the transformer by a zero-current detecting device, generating a switching signal for switching the power converter by an oscillating device, and generating an integrated signal by integrating the converted voltage of the primary side switching peak current with the discharging time.

It is to be understood that both the foregoing general descriptions and the following detailed descriptions are exemplary, and are intended to provide further explanation of the invention as claimed. Still further objects and advantages will become apparent from consideration of the ensuing description and drawings.

DESCRIPTION OF THE EMBODIMENTS

Figure 1:
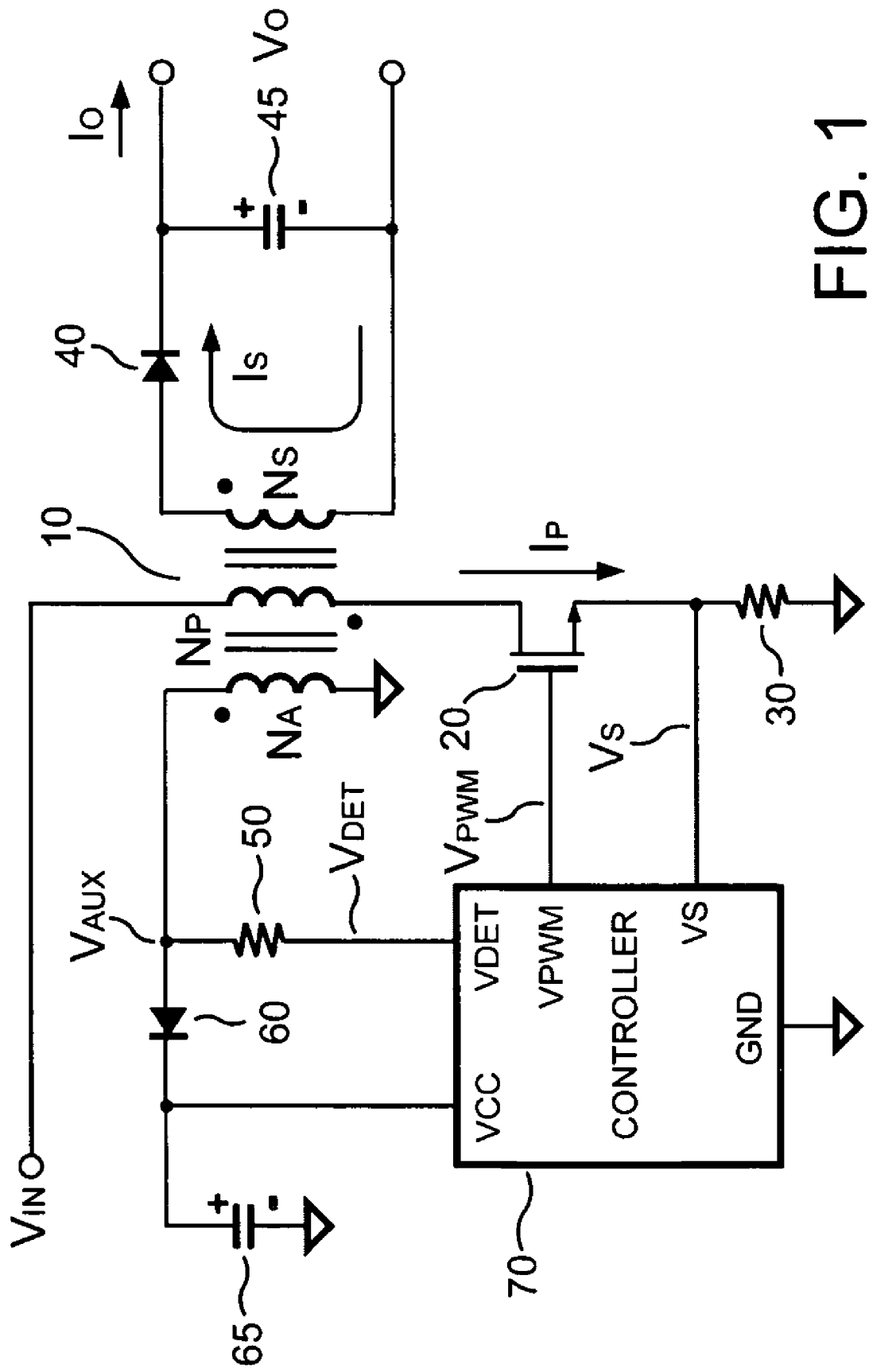
FIG. 1 is a schematic circuit diagram illustrating a power converter according to one embodiment of the present invention.
Figure 2:
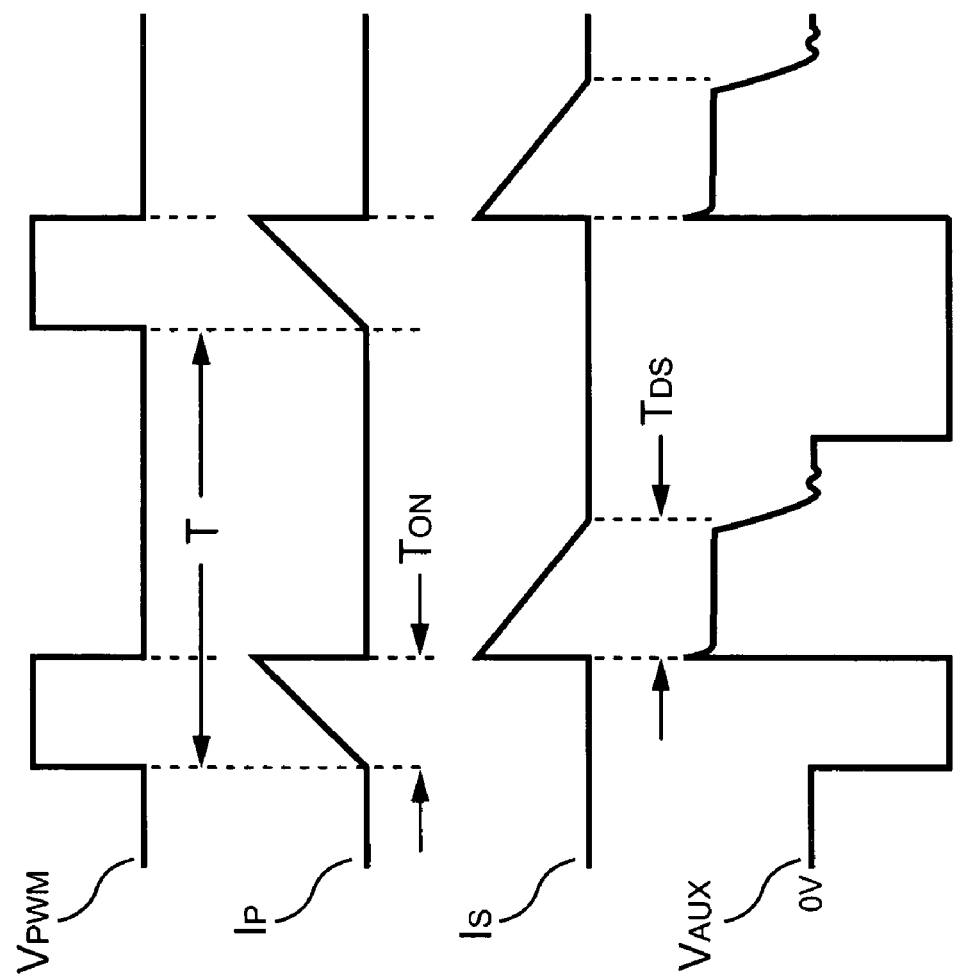
FIG. 2 is a schematic diagram illustrating various signal waveforms of the power converter according to one embodiment of the present invention.

Referring to FIG. 1, a schematic circuit diagram of a power converter according to one embodiment of the present invention is illustrated. The power converter includes a transformer 10 having an auxiliary winding $N_A$, a primary winding $N_P$, and a secondary winding $N_S$. In order to regulate an output voltage $V_O$ and/or an output current $I_O$ of the power converter, a controller 70 generates a PWM control signal $V_{PWM}$ to switch the transformer 10 by switching a transistor 20. Referring to FIG. 2, a schematic diagram of various signal waveforms of the power converter in FIG. 1 is illustrated. As the PWM control signal $V_{PWM}$ raises to high, a primary-side switching current $I_P$ is generated accordingly. The primary-side switching current $I_P$ is given by, $$I_P = \frac{V_{IN}}{L_P} \times T_{ON} \quad (1)$$

where $V_{IN}$ is an input voltage applied to the transformer 10, $L_P$ is the inductance of the primary winding $N_P$ of the transformer 10, and $T_{ON}$ is an on-time interval of the PWM control signal $V_{PWM}$.

As the PWM control signal $V_{PWM}$ drops to low, energy stored in the transformer 10 will be delivered to a secondary side of the transformer 10 and to an output of the power converter via a rectifier 40. A secondary-side switching current $I_S$ can be expressed as:

$$I_S = \frac{(V_O + V_F)}{L_S} \times T_{DS} \quad (2)$$

where $V_O$ is the output voltage of the power converter, $V_F$ is the forward voltage drop across the rectifier 40, $L_S$ is the inductance of the secondary winding $N_S$ of the transformer 10, and $T_{DS}$ is a discharging time of the secondary-side switching current Is.

In the mean time, a reflected voltage $V_{AUX}$ is generated at the auxiliary winding $N_A$ of the transformer 10. The reflected voltage $V_{AUX}$ is given as:

$$V_{AUX} = \frac{T_{NA}}{T_{NS}} \times (V_O + V_F) \quad (3)$$

where $T_{NA}$ and $T_{NS}$ are respectively the winding turns of the auxiliary winding $N_A$ and the secondary winding $N_S$.

The reflected voltage $V_{AUX}$ will start to decrease as the secondary-side switching current $I_S$ reduces to zero. This also indicates that energy of the transformer 10 is fully released at this moment. Therefore, as shown in FIG. 2, the discharging time $T_{DS}$ in equation (2) can be measured from the falling edge of the PWM control signal $V_{PWM}$ to the falling point of the reflected voltage $V_{AUX}$.

Referring to FIG. 1, the controller 70 has a supply terminal VCC, a voltage-detection terminal VDET, a ground terminal GND, a current-sense terminal VS, and an output terminal VPWM. The output terminal $V_{PWM}$ outputs the PWM control signal $V_{PWM}$. The voltage-detection terminal VDET is connected to the auxiliary winding $N_A$ via a resistor 50 for detecting the reflected voltage $V_{AUX}$. The reflected voltage $V_{AUX}$ further charges a supply capacitor 65 via a rectifier 60 to power the controller 70. A current-sense resistor 30 is connected from a source of the transistor 20 to a ground reference level for converting the primary-side switching current $I_P$ to be a converted voltage $V_S$.

Figure 3:
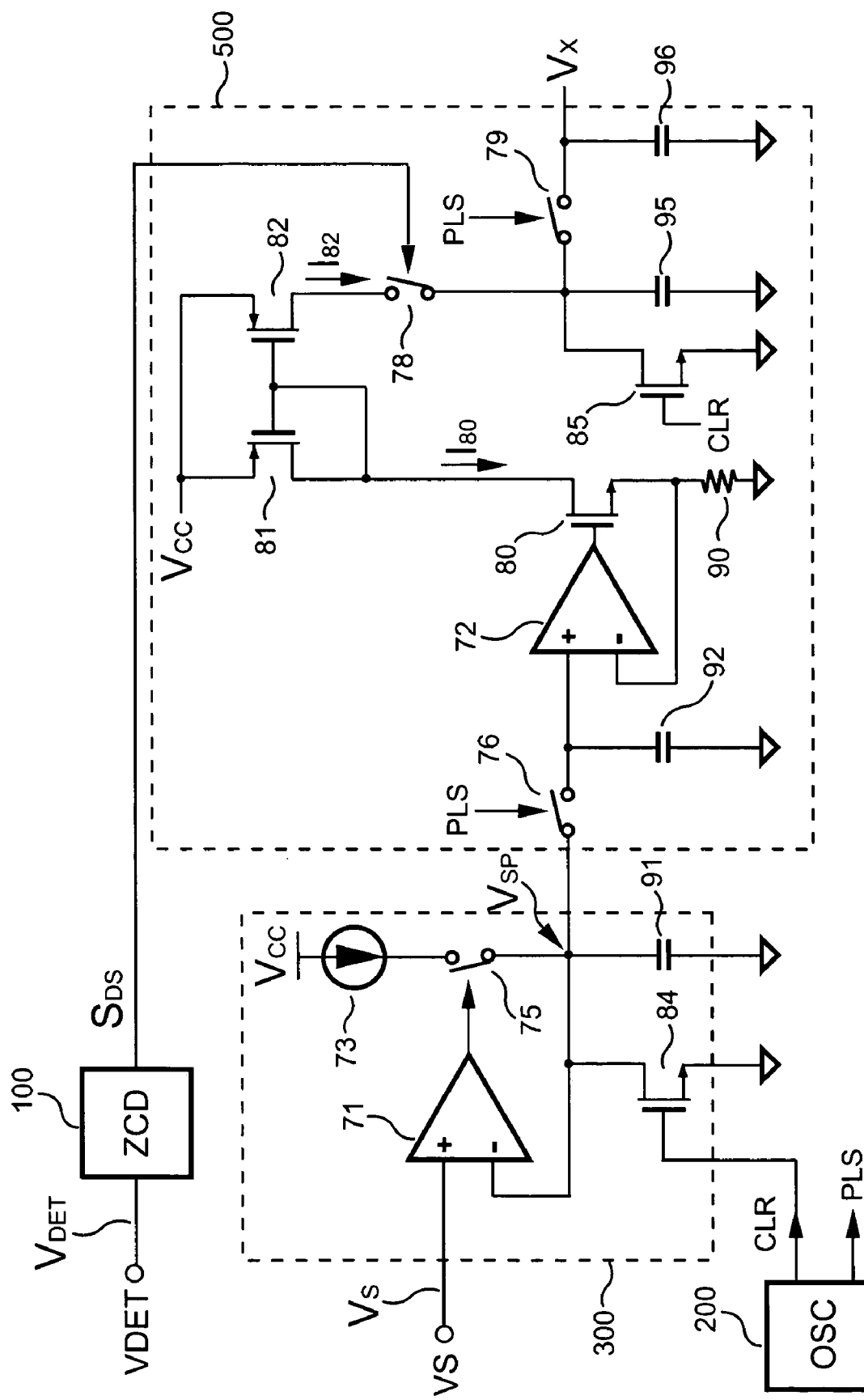
FIG. 3 is a schematic circuit diagram illustrating a measuring method for an output current of the power converter according to one embodiment of the present invention.

Referring to FIG. 3, a schematic circuit diagram for measuring the output current $I_O$ according to one embodiment of the present invention is illustrated. A peak detector 300 samples the converted voltage $V_S$ of a primary-side switching peak current. A zero-current detector (ZCD) 100 detects the discharging time $T_{DS}$ of the secondary-side switching current $I_S$ via the auxiliary winding $N_A$ of the transformer 10. An oscillator 200 generates a high-frequency signal to switch the power converter. A pulse signal PLS is generated from the oscillator 200 for synchronizing and generating the PWM control signal $V_{PWM}$. An integrator 500 is designed to generate an integrated signal $V_X$ by integrating the converted voltage $V_S$ of the primary-side switching peak current with the discharging time $T_{DS}$. A time constant of the integrator 500 is correlated with the switching period T of the switching frequency. The integrated signal $V_X$ is therefore proportional to the output current $I_O$ of the power converter. The primary-side switching peak current is a peak value of the primary-side switching current $I_P$. The primary-side switching current $I_P$ and the secondary-side switching current $I_S$ are respectively the switching current in the primary side and the secondary side of the transformer 10. According to the waveforms in FIG. 2, the output current $I_O$ of the power converter is given as:

$$I_O = I_S \times \frac{T_{DS}}{2 \times T} \quad (4)$$

The primary-side switching current $I_P$ and the winding turns of the transformer 10 determines the secondary-side switching current $I_S$. The secondary-side switching current $I_S$ can be given by, $$I_S = \frac{T_{NP}}{T_{NS}} \times I_P \quad (5)$$

where $T_{NP}$ is the winding turns of the primary winding $N_P$ of the transformer 10.

The primary-side switching current $I_P$ is converted to the converted voltage $V_S$ through the current-sense resistor 30. $R_S$ is the resistance of the current-sense resistor 30. The peak detector 300 generates a peak voltage signal $V_{SP}$ by sampling the converted voltage $V_S$. The integrated signal $V_X$ can be expressed as:

$$V_X = \frac{V_{SP} \times T_{DS}}{T_I} \quad (6)$$

It is noted that in equations (4)–(6) the integrated signal $V_X$ can be rewritten as:

$$V_X = \frac{2T}{T_I} \times \frac{T_{NS}}{T_{NP}} \times R_S \times I_O \quad (7)$$

where $T_I$ is the time constant of the integrator 500.

It can be found that the integrated signal $V_X$ is proportional to the output current $I_O$ of the power converter as shown in equation (7).

Further referring to FIG. 3, the peak detector 300 includes a comparator 71 having a positive input connected to the current-sense terminal VS. The value of the converted voltage $V_S$ is proportional to the value of the primary-side switching current $I_P$. A capacitor 91 is used for holding the peak value of the converted voltage $V_S$. The peak voltage signal $V_{SP}$ is thus obtained across the capacitor 91. A negative input of the comparator 71 is connected to the capacitor 91. A constant current source 73 is applied to charge the capacitor 91. A switch 75 is connected between the constant current source 73 and the capacitor 91. The switch 75 is turned on/off by an output of the comparator 71. A transistor 84 is connected in parallel with the capacitor 91 to discharge the capacitor 91.

The integrator 500 includes a switch 76 used for periodically sampling the peak voltage signal $V_{SP}$ from the capacitor 91 to a capacitor 92. An operational amplifier 72, a resistor 90 and a transistor 80 form a first V-to-I converter for generating a programmable current $I_{80}$ in response to a voltage across the capacitor 92. A positive input of the operational amplifier 72 is connected to the capacitor 92. A negative input of the operational amplifier 72 is connected to a resistor 90. A transistor 81 and a transistor 82 form a current mirror. The current mirror mirrors a programmable charge current $I_{82}$ from the programmable current $I_{80}$. A drain and a gate of the transistor 81 are connected to a drain of the transistor 80. A drain of the transistor 82 outputs the programmable charge current $I_{82}$. A switch 78 is connected between the drain of the transistor 82 and a capacitor 95. The switch 78 is only turned on during the period of the discharge-time $T_{DS}$. A transistor 85 is connected in parallel with the capacitor 95 to discharge the capacitor 95. A switch 79 is used to periodically sample a voltage across the capacitor 95 to an output capacitor 96. The integrated signal $V_X$ is therefore obtained across the output capacitor 96. The resistor 90 and the capacitor 95 determine the time constant of the integrator 500.

Figure 4:
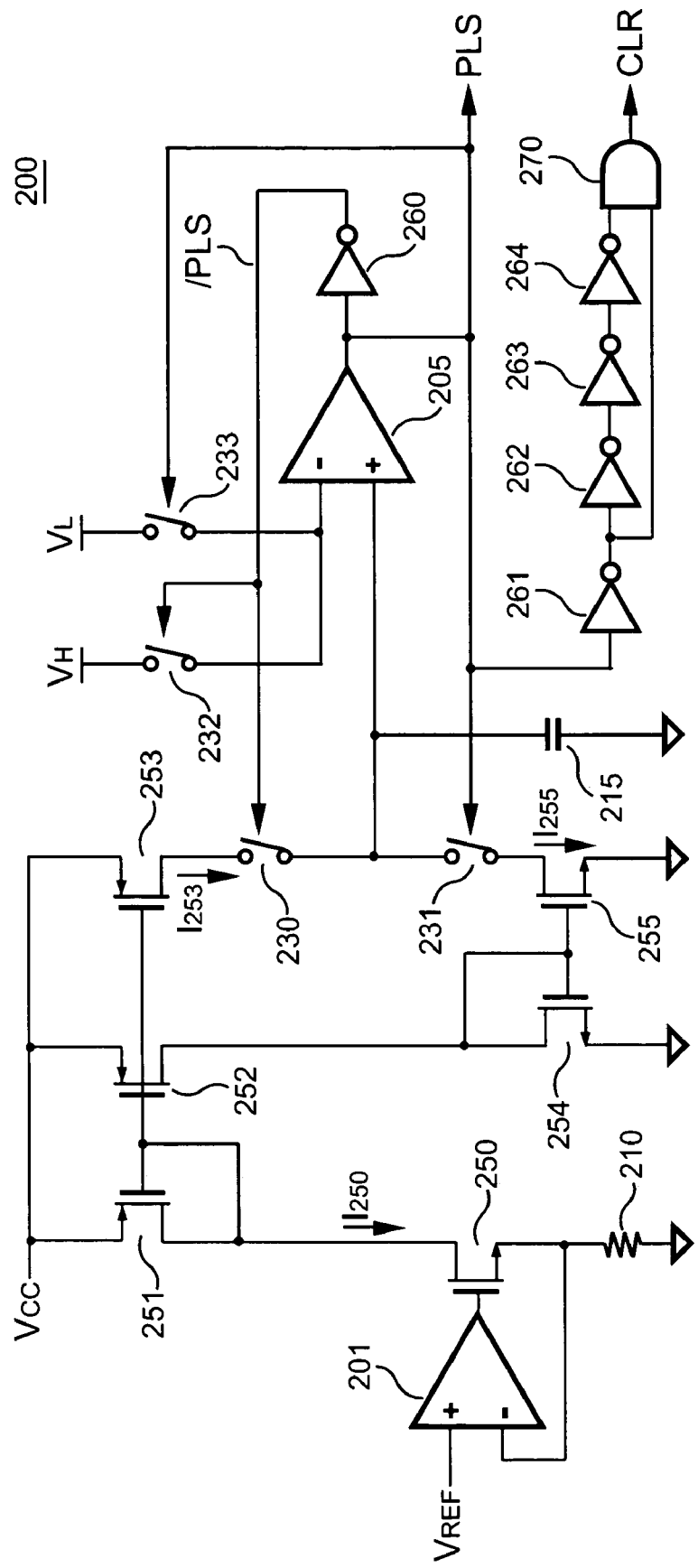
FIG. 4 is a schematic circuit diagram illustrating an oscillator of the power converter according one embodiment of the present invention.

Referring to FIG. 4, an oscillator 200 of the power converter according to one embodiment of the present invention is illustrated. An operational amplifier 201, a resistor 210 and a transistor 250 form a second V-to-I converter. The second V-to-I converter generates a reference current $I_{250}$ in response to a reference voltage $V_{REF}$. A plurality of transistors, such as 251, 252, 253, 254 and 255 form current mirrors for generating an oscillator charge current $I_{253}$ and an oscillator discharge current $I_{255}$ in response to the reference current $I_{250}$. A drain of the transistor 253 generates the oscillator charge current $I_{253}$. The oscillator discharge current $I_{255}$ flows via a drain of the transistor 253. A switch 230 is connected between the drain of the transistor 253 and a capacitor 215. A switch 231 is connected between the drain of the transistor 255 and the capacitor 215. A comparator 205 has a positive input connected to the capacitor 215. The comparator 205 outputs a pulse signal PLS. The pulse signal PLS determines the switching frequency and turns on/off the switch 76 and the switch 79 as shown in FIG. 3. A first terminal of a switch 232 is supplied with a high-threshold voltage $V_H$. A first terminal of a switch 233 is supplied with a low-threshold voltage $V_L$. A second terminal of the switch 232 and a second terminal of the switch 233 are both connected to a negative input of the comparator 205. An input of an inverter 260 is connected to an output of the comparator 205 for producing an inverse pulse signal /PLS. The pulse signal PLS turns on/off the switch 231 and the switch 233. The inverse pulse signal /PLS turns on/off the switch 230 and the switch 232. Inverters 261, 262, 263 and 264 are connected in series. An input of the inverter 261 is supplied with the pulse signal PLS. An AND gate 270 generates a clear signal CLR. A first input of the AND gate 270 is connected to an output of the inverter 264. A second input of the AND gate 270 is connected to an output of the inverter 261. The clear signal CLR turns on/off the transistor 84 and the transistor 85. The resistance $R_{210}$ of the resistor 210 and the capacitance $C_{215}$ of the capacitor 215 determine the switching period T of the switching frequency, $$T = \frac{C_{215} \times V_{OSC}}{V_{REF}/R_{210}} = R_{210} \times C_{215} \times \frac{V_{OSC}}{V_{REF}} \quad (8)$$

where $V_{OSC} = V_H - V_L$

Figure 5:
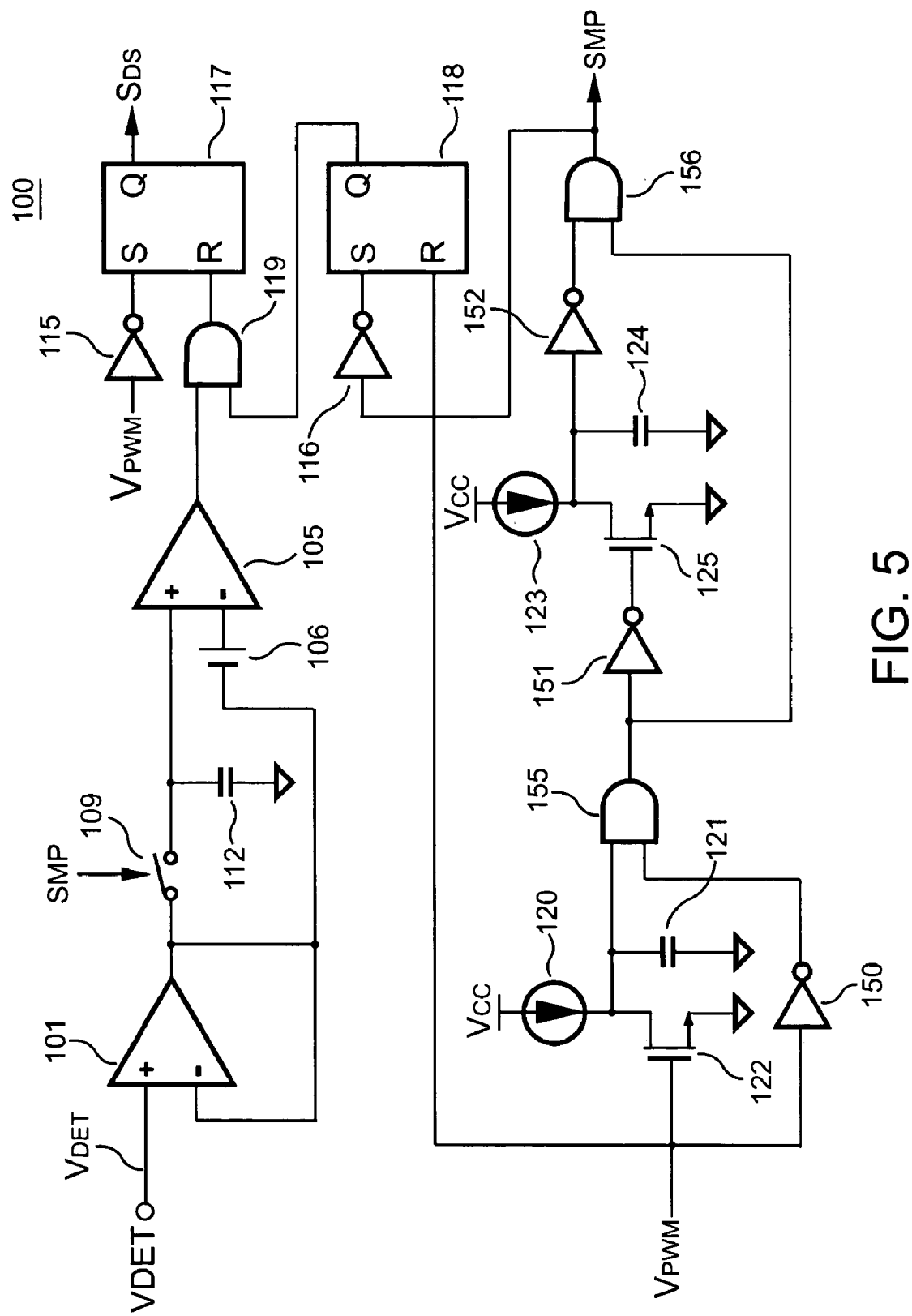
FIG. 5 is a schematic circuit diagram illustrating a zero-current detector of the power converter according to one embodiment of the present invention.

Referring to FIG. 5, the zero-current detector 100 of the power converter according to one embodiment of the present invention is illustrated. A delay circuit of the zero-current detector 100 includes an inverter 150, a transistor 122, a constant current source 120, a capacitor 121 and an AND gate 155. An input of the delay circuit is supplied with the PWM control signal $V_{PWM}$. The delay circuit provides a propagation delay time for the falling edge of the PWM control signal $V_{PWM}$. The current of the constant current source 120 and the capacitance of the capacitor 121 determine the propagation delay time. An inverter 151, an inverter 152, a transistor 125, a constant current source 123, a capacitor 124 and an AND gate 156 form a one-shot signal generator for generating a voltage sample signal SMP. An input of the one-shot signal generator is connected to an output of the delay circuit, which is also an output of the AND gate 155. The current of the constant current source 123 and the capacitance of the capacitor 124 determine a pulse width of the voltage sample signal SMP.

An operational amplifier 101 is performed as a buffer amplifier. A negative input and an output of the operational amplifier 101 are connected together. A positive input of the operational amplifier 101 is an input of the buffer amplifier that is connected to the voltage-detection terminal VDET. The voltage-detection terminal VDET is connected to the auxiliary winding $N_A$ of the transformer 10 via the resistor 50 for detecting the reflected voltage $V_{AUX}$. A switch 109 is connected between an output of the buffer amplifier and a capacitor 112. The voltage sample signal SMP turns on/off the switch 109. Therefore, the reflected voltage $V_{AUX}$ is sampled as a voltage $V_{DET}$. The voltage $V_{DET}$ will be held in the capacitor 112. A comparator 105 is used to detect the decrement of the reflected voltage $V_{AUX}$, in which a positive input of the comparator 105 is connected to the capacitor 112. A reference threshold voltage source 106 is coupled between a negative input of the comparator 105 and the output of the buffer amplifier to provide a threshold for detecting the decrement of the reflected voltage $V_{AUX}$. Therefore, the comparator 105 will output a logic-high signal once the decrement of the reflected voltage is beyond the voltage of the reference threshold voltage source 106. An input of an inverter 115 is supplied with the PWM control signal $V_{PWM}$. An input of an inverter 116 is supplied with the voltage sample signal SMP. An AND gate 119 has a first input connected to an output of the comparator 105. A SR flip-flop 117 and a SR flip-flop 118 have a rising-edge triggered set-input and a high-level reset-input respectively. The set-input of the SR flip-flop 118 is connected to an output of the inverter 116. The reset-input of the SR flip-flop 118 is supplied with the PWM control signal $V_{PWM}$. An output of the SR flip-flop 118 is connected to a second input of the AND gate 119. The SR flip-flop 117 is used for generating a discharge-time signal $S_{DS}$. The set-input of the SR flip-flop 117 is connected to an output of the inverter 115. The reset-input of the SR flip-flop 117 is connected to an output of the AND gate 119. The discharge-time signal $S_{DS}$ turns on/off the switch 78, in which the pulse width of the discharge-time signal $S_{DS}$ is correlated to the discharge-time $T_{DS}$ of the secondary-side switching current $I_S$.

According to the above descriptions of the embodiment of the present invention referred to FIG. 3~5, the integrated signal $V_X$ is correlated to the secondary-side switching current $I_S$ and the output current $I_O$ of the power converter. Thus, the equation (7) can be rewritten as:

$$V_X = m \times \frac{T_{NS}}{T_{NP}} \times R_S \times I_O \quad (9)$$

where m is a constant which can be determined by:

$$m = \frac{2 \times R_{210} \times C_{215}}{R_{90} \times C_{95}} \times \frac{V_{OSC}}{V_{REF}} \quad (10)$$

The resistance $R_{90}$ of the resistor 90 in FIG. 3 is correlated to the resistance $R_{210}$ of the resistor 210 in FIG. 4. The capacitance $C_{95}$ of the capacitor 95 in FIG. 3 is correlated to the capacitance $C_{215}$ of the capacitor 215 in FIG. 4. Therefore, the integrated signal $V_X$ is proportional to the output current $I_O$ of the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An apparatus for measuring an output current from a primary side of a power converter, comprising:
   a peak detector, sampling a converted voltage of a primary-side switching peak current, wherein said primary-side switching peak current is a peak value of a primary-side switching current, wherein said primary-side switching current is generated from said primary side of a transformer of the power converter;

a zero-current detector, detecting a discharge-time of a secondary-side switching current through an auxiliary winding of said transformer, wherein said secondary-side switching current is generated from a secondary side of said transformer; and an integrator, for generating an integrated signal by integrating said converted voltage of said primary-side switching peak current with said discharge-time.

2. The apparatus as recited in claim 1, further comprising an oscillator to generate a switching frequency for switching the power converter.

3. The apparatus as recited in claim 2, wherein a time constant of said integrator is correlated with a switching period of said switching frequency.

4. The apparatus as recited in claim 2, wherein said oscillator comprises:

a second V-to-I converter, generating a reference current by converting a reference voltage, wherein said second V-to-I converter is formed by an osc operational amplifier, an osc resistor, and an osc transistor;

a first osc current mirror, generating an osc charge current, wherein said first osc current mirror is formed by a first osc transistor, a second osc transistor and a third osc transistor;

a second osc current mirror, generating an osc discharge current, wherein said second osc current mirror is formed by a fourth osc transistor and a fifth osc transistor;

an osc capacitor;

a first osc switch, coupled between a drain of said third osc transistor and said osc capacitor;

a second osc switch, coupled between said osc capacitor and a drain of said fifth osc transistor;

an osc comparator, generating a pulse signal for determining said switching frequency, and for controlling on/off status of said second osc switch;

a third osc switch, having a first terminal supplied with a high-threshold voltage and a second terminal coupled to a negative input of said osc comparator;

a fourth osc switch, having a first terminal supplied with a low-threshold voltage and a second terminal coupled to said negative input of said osc comparator, wherein said fourth osc switch is controlled by said pulse signal;

an osc inverter, having an input coupled to an output of said osc comparator for producing an inverse pulse signal;

a first inverter, a second inverter, a third inverter and a fourth inverter coupled in series sequentially, wherein an input of said first inverter is supplied with said pulse signal; and an AND gate, generating a clear signal, wherein a first input of said AND gate is coupled to an output of said fourth inverter, a second input of said AND gate is coupled to an output of said first inverter, and said clear signal controls on/off status of said first transistor and said second transistor.

5. The apparatus as recited in claim 4, wherein said pulse signal controls on/off status of said second osc switch and said fourth osc switch, and said inverse pulse signal controls on/off status of said first osc switch and said third osc switch.

6. The apparatus as recited claimed in claim 4, wherein a resistance of a timing resistor is correlated to a resistance of said osc resistor.

7. The apparatus as recited claimed in claim 4, wherein a capacitance of a timing capacitor is correlated to a capacitance of said osc capacitor.

8. The apparatus as recited in claim 1, wherein said integrated signal is proportional to said output current of the power converter.

9. The apparatus as recited in claim 1, wherein said peak detector comprises:

a first comparator, having a positive input coupled to a current-sense terminal to transfer said converted voltage;

a first capacitor, for holding a peak value of said converted voltage, wherein a negative input of said first comparator is coupled to said first capacitor;

a first constant current source, for charging said first capacitor;

a first switch, coupled between said first constant current source and said first capacitor, wherein said first switch is turned on/off by an output of said first comparator; and a first transistor, coupled in parallel with said first capacitor for discharging said first capacitor.

10. The apparatus as recited in claim 9, wherein said current-sense terminal receives said converted voltage.

11. The apparatus as recited in claim 9, wherein the value of said converted voltage is proportional to the value of said primary-side switching current.

12. The apparatus as recited in claim 1, wherein said integrator comprises:

a second capacitor;

a second switch for periodically sampling a voltage across said a first capacitor to said second capacitor;

a first V-to-I converter, generating a programmable current in response to a voltage across said second capacitor;

a timing current mirror, producing a programmable charge current in response to said programmable current, wherein said timing current mirror is formed by a first timing transistor and a second timing transistor;

a timing capacitor;

a third switch, coupled between a drain of said second timing transistor and said timing capacitor, wherein said programmable charge current is generated via said drain of said second timing transistor;

a second transistor, coupled in parallel with said timing capacitor for discharging said timing capacitor;

an output capacitor; and a fourth switch, for periodically sampling a voltage across said timing capacitor to said output capacitor, wherein said integrated signal is obtained across said output capacitor.

13. The apparatus as recited in claim 12, wherein said first V-to-I converter comprises:

a timing resistor;

a timing transistor; and a timing operational amplifier, wherein a positive input of said timing operational amplifier is connected to said second capacitor and a negative input of said timing operational amplifier is connected to said timing resistor.

14. The apparatus as recited in claim 1, wherein said zero-current detector comprises:

a delay circuit, having a first zcd inverter, a first zcd transistor, a first zcd constant current source, a first zcd capacitor and a first zcd AND gate, wherein an input of said delay circuit is supplied with a PWM control signal, wherein said PWM control signal is used for switching said transformer via a power transistor in the primary side of the power converter, wherein said delay circuit provides a propagation delay for a falling edge of said PWM control signal, wherein a time interval of said propagation delay is determined by a current of said first zcd constant current source and a capacitance of said first zcd capacitor;

a one-shot signal generator, having a second zcd inverter, a third zcd inverter, a second zcd transistor, a second zcd constant current source, a second zcd capacitor and a second zcd AND gate, wherein said one-shot signal generator generates a voltage sample signal, wherein an input of said one-shot signal generator is coupled to an output of said delay circuit, wherein a pulse width of said voltage sample signal is determined by a current of said second zcd constant current source and a capacitance of said second zcd capacitor;

a zcd operational amplifier, serving as a buffer amplifier, wherein an input of said zcd operational amplifier is coupled to a voltage-detection terminal, wherein said voltage-detection terminal is coupled to said auxiliary winding of said transformer via a zcd resistor;

a sampling capacitor;

a sampling switch, coupled between an output of said zcd operational amplifier and said sampling capacitor, wherein said voltage sample signal controls on/off status of said sampling switch;

a zcd comparator, wherein a positive input of said zcd comparator is coupled to said sampling capacitor;

a reference threshold voltage source, coupled between a negative input of said zcd comparator and said output of said zcd operational amplifier;

a fourth zcd inverter, having an input supplied with said PWM control signal;

a fifth zcd inverter, having an input supplied with said voltage sample signal;

a zcd AND gate, having a first input coupled to an output of said zed comparator;

a first SR flip-flop, having a rising-edge triggered set-input and a high-level reset-input, wherein said first SR flip-flop is used for generating a discharge-time signal, wherein said set-input of said first SR flip-flop is coupled to an output of said fourth zcd inverter, said reset-input of said first SR flip-flop is coupled to an output of said zcd AND gate, said discharge-time signal controls on/off status of said third switch, and a pulse width of said discharge-time signal is correlated to a discharge-time of said secondary-side switching current; and a second SR flip-flop, having a rising-edge triggered set-input and a high-level reset-input, wherein said set-input of said second SR flip-flop is coupled to an output of said fifth zcd inverter, said reset-input of said second SR flip-flop is supplied with said PWM control signal, and an output of said second SR flip-flop is coupled to a second input of said zcd AND gate.

15. A method for measuring an output current from a primary side of a power converter, the power converter having a primary winding, a secondary winding and an auxiliary winding, the method comprising the steps of:

detecting a peak value of a converted voltage of a primary-side switching current;

detecting a discharge time of a secondary-side switching current through an auxiliary winding of a transformer of the power converter;

integrating said peak value of said converted voltage of said primary-side switching current with said discharge time to obtain a time constant;

obtaining said output current of the power converter in proportion to an integrated signal.

16. The method as recited in claim 15 further comprising the steps of:

generating a switching signal for switching the power converter with an oscillating method, wherein said oscillating method comprises operating an oscillating device;

obtaining a switching period of said switching signal.

17. The method as recited in claim 16, wherein said integrated signal is a function of said time constant and said switching period.

18. The method as recited in claim 15, wherein the step of detecting said peak value of said primary-side switching current comprises operating a peak detecting circuit.

19. The method as recited in claim 15, wherein the step of detecting said discharge time comprises a zero-current detecting method.

20. The method as recited in claim 15, wherein the step of integrating said convened voltage comprises operating an integrating device.

* * * * *